*Inventor*
RICHARD JOHN OULTON

Aug. 29, 1972  R. J. OULTON  3,687,648
HEATING AND BENDING OF GLASS SHEETS DURING VERTICAL CONVEYANCE
Filed June 16, 1969  10 Sheets-Sheet 2

Inventor
RICHARD JOHN OULTON
By
Morrison Kennedy & Campbell
Attorneys

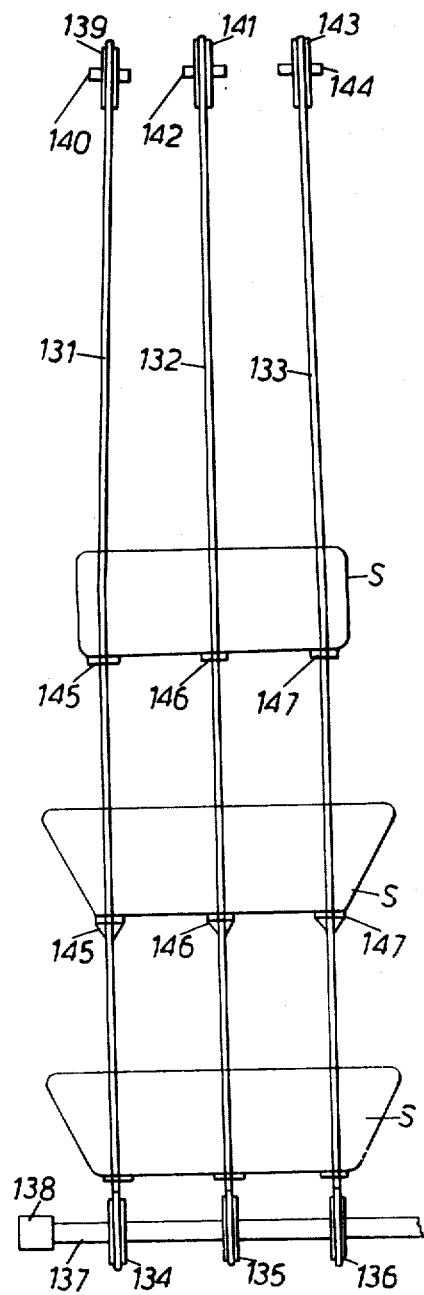

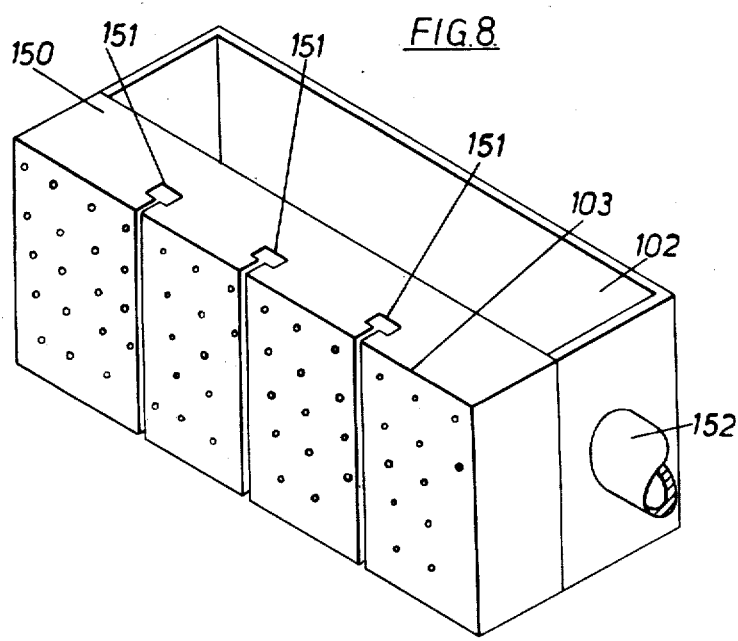
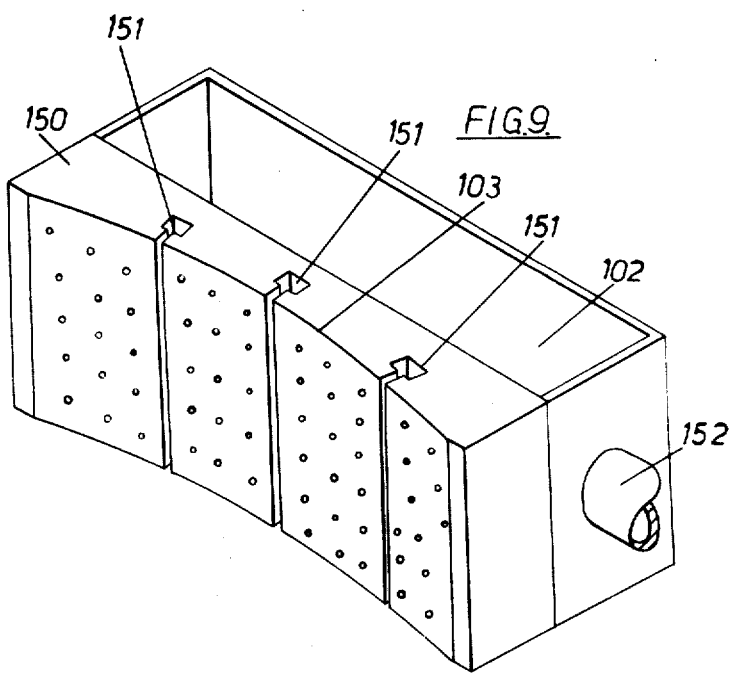

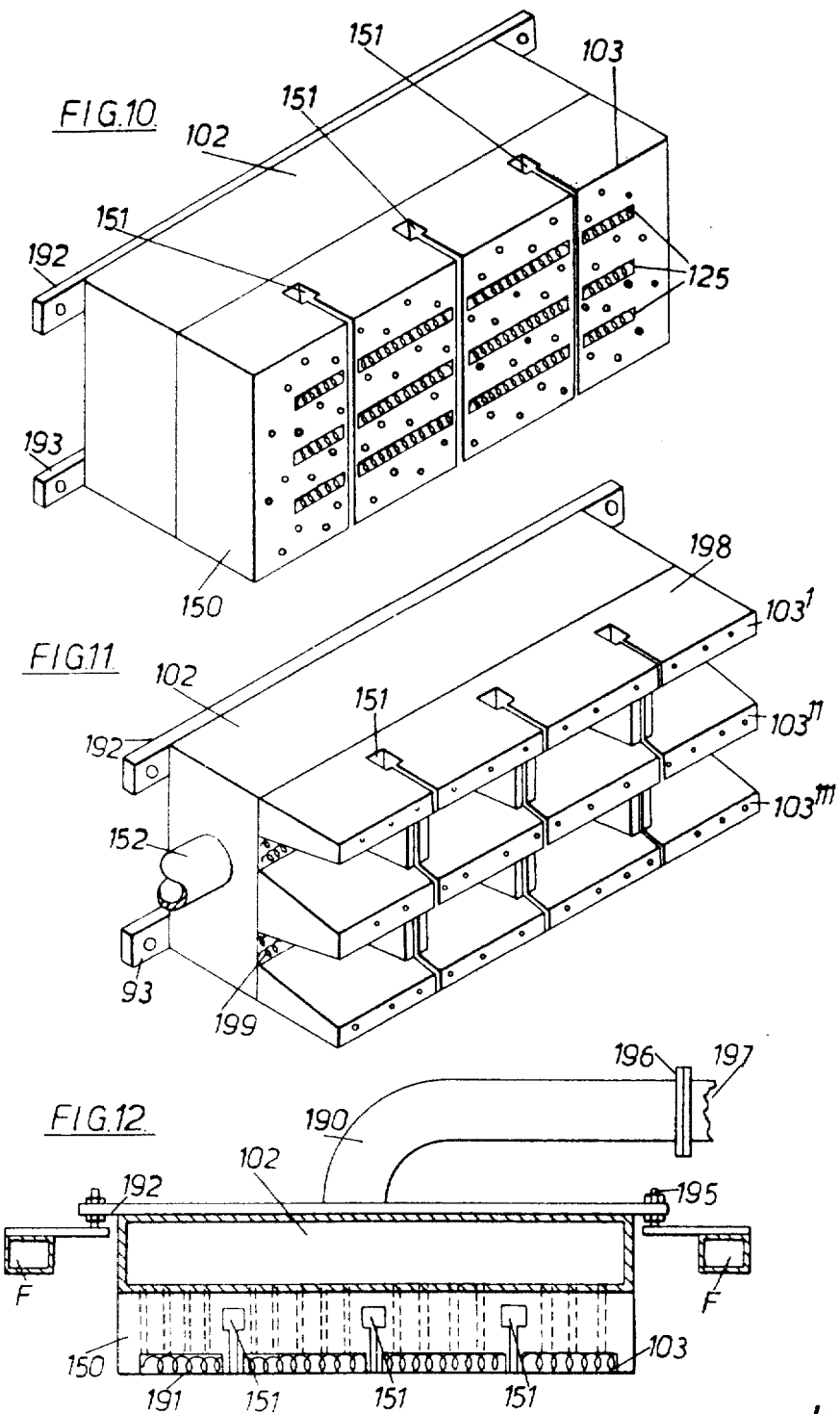

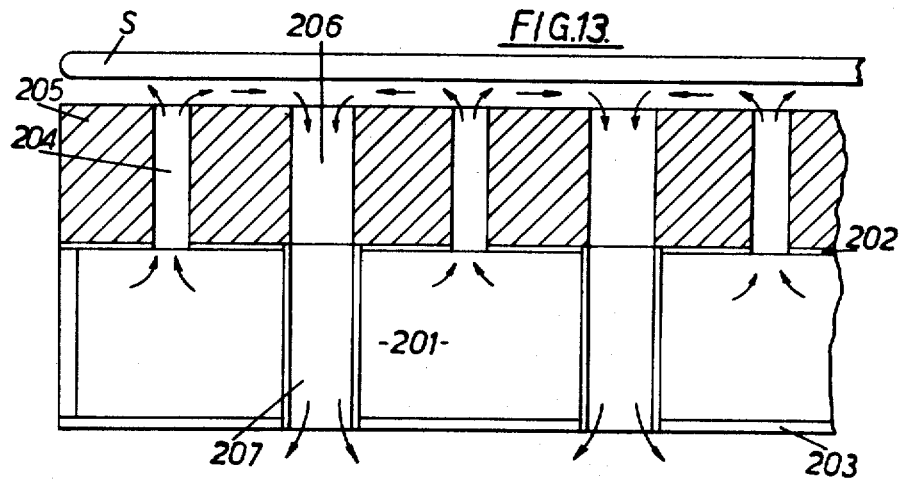
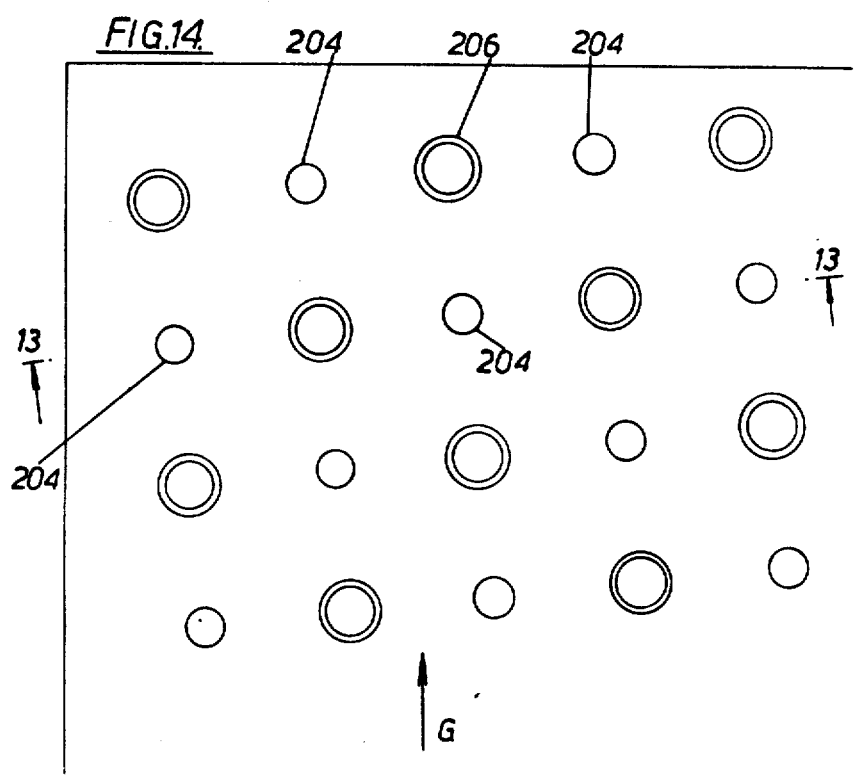

United States Patent Office 3,687,648
Patented Aug. 29, 1972

3,687,648
HEATING AND BENDING OF GLASS SHEETS DURING VERTICAL CONVEYANCE

Richard John Oulton, Maghull, England, assignor to Pilkington Brothers Limited, Liverpool, England
Filed June 16, 1969, Ser. No. 833,498
Claims priority, application Great Britain, June 14, 1968, 28,507/68
Int. Cl. C03b 39/00
U.S. Cl. 65—25        11 Claims

ABSTRACT OF THE DISCLOSURE

A flat glass sheet is heated and then in a vertically disposed process by resting the sheet only by its lower edge on a vertically moving support, and during the vertical movement of the sheet, directing hot gas streams through interchangeable gas boxes having gas discharge outlets towards each face of the sheet, which gas streams maintain the sheet in upright disposition and heat the sheet prior to progressive bending after bending the sheet is passed between cooling boxes.

BACKGROUND OF THE INVENTION

The present invention relates to a process and apparatus for treating glass sheets. The invention has particular application in the toughening or bending of glass sheets, but in addition the process may be used for coating glass sheets.

Known processes for toughening or bending glass sheets in which the glass sheets are treated in a vertical disposition involve suspending the glass sheets from clamps which grip the surfaces of the glass sheets near to their edges while the glass sheets are heated, for example by passing them through the heating chamber of a furnace. Alternatively, the glass sheets may be supported on their lower edges and maintained in a vertical disposition by fingers touching their edge portions. All such processes result in marks being produced on the glass sheets by the holding means while the glass is hot.

It is an object of the present invention to provide a process by which glass sheets may be treated, for example may be toughened, bent or coated, without marks being produced on their surfaces.

SUMMARY

In a method of treating a glass sheet disposed in an upright disposition according to the present invention, the glass sheet is rested by its lower edge on a vertically moving support and during the vertical movement of the glass sheet on its support heated gaseous streams are directed towards each face of the sheet to produce forces acting on the sheet to correct any deviation of the sheet from the upright disposition.

In methods such as toughening or bending, the glass sheet must be heated during the treatment by passing it through a heating zone, and in this zone the sheet may be heated by hot gas streams which streams also provide the gas pressures which assist in maintaining the glass sheet in its vertical orientation. For toughening, the glass sheet may first be heated in the heating zone and then rapidly cooled by cold gas streams in a cooling zone.

Where the glass sheet is curved, or is bent during the treatment, the sheet is preferably disposed so that its curvature is substantially about a vertical axis, and is conveyed in the vertical direction through a vertically extending gap having a curvature conforming with that of the glass sheet or with that to be imparted to the sheet.

The invention also provides a method of bending a flat glass sheet to a desired curvature, in which said sheet is disposed in an upright disposition for the necessary heat treatment of the glass, and then moved in the upright position to a bending station at which the sheet is rested by its lower edge on a movable support and is surrounded by a vertical cavity wall structure having an apertured discharge face and means for supplying heated gas to the interior of the wall structure for distribution throughout said apertured face on to the sheet, the discharge face means in the bending station being shaped to bend the sheet progressively, stage by stage, to the desired curvature.

The invention also comprehends apparatus for treating glass sheets comprising a treatment zone which includes opposing gas discharge outlets defining therebetween a substantially vertical gap, conveyor means adapted to support a glass sheet by its lower edge and to convey the sheet vertically through the gap, and means for supplying gas under pressure to the said discharge outlets to form opposing gas streams for impingement on opposite faces of said sheet to maintain the sheet in a substantially vertical orientation as it is conveyed vertically through said gap.

The invention also comprehends a glass sheet treated by a method as set out above.

BRIEF DESCRIPTION OF THE DRAWINGS

FIG. 7 is a diagrammatic front elevation of vertical conveyor system for the second embodiment of the invention, FIGS. 8 and 9 are diagrammatic partially sectioned perspective views of gas boxes of the second embodiment in the heating and bending zones respectively, FIGS. 10, 11 and 12 are perspective views of three further types of gas box for use with the second embodiment, and FIGS. 13 and 14 are respectively a horizontal section through, and an end view of, a further type of gas box for the second embodiment.

DESCRIPTION OF THE PREFERRED EMBODIMENTS

Figure 1:
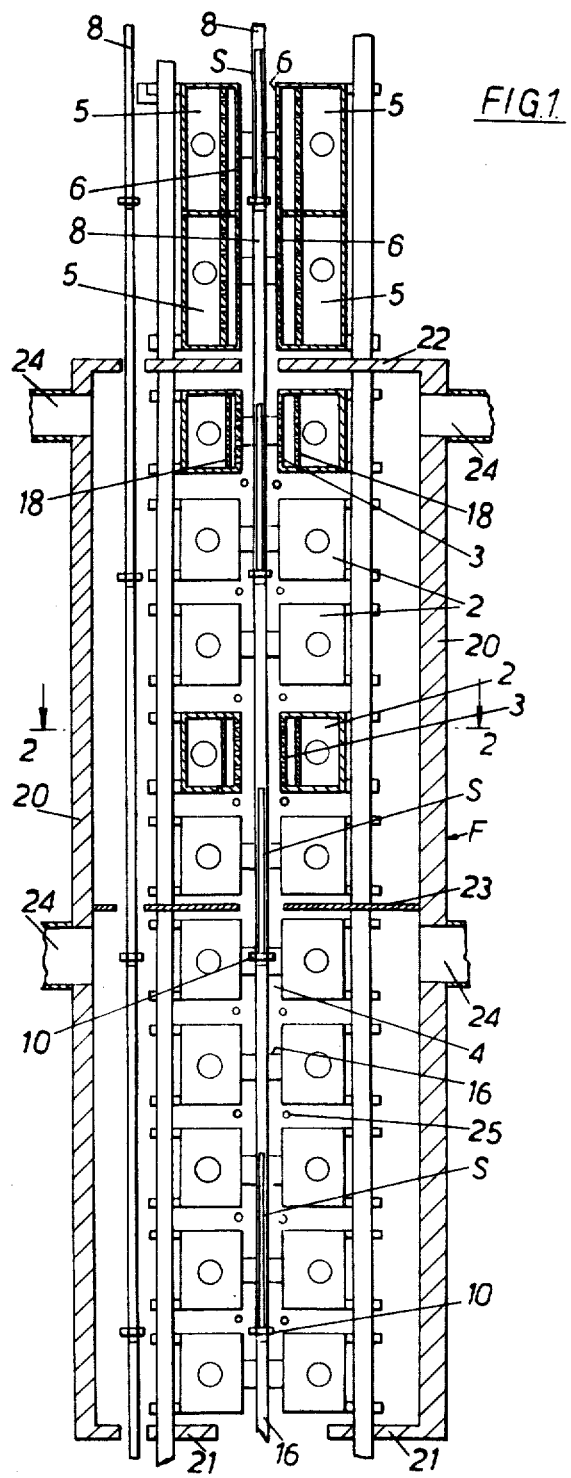
FIG. 1 shows a cross-sectional elevation of a first embodiment of the invention for toughening flat glass sheets.
Figure 2:
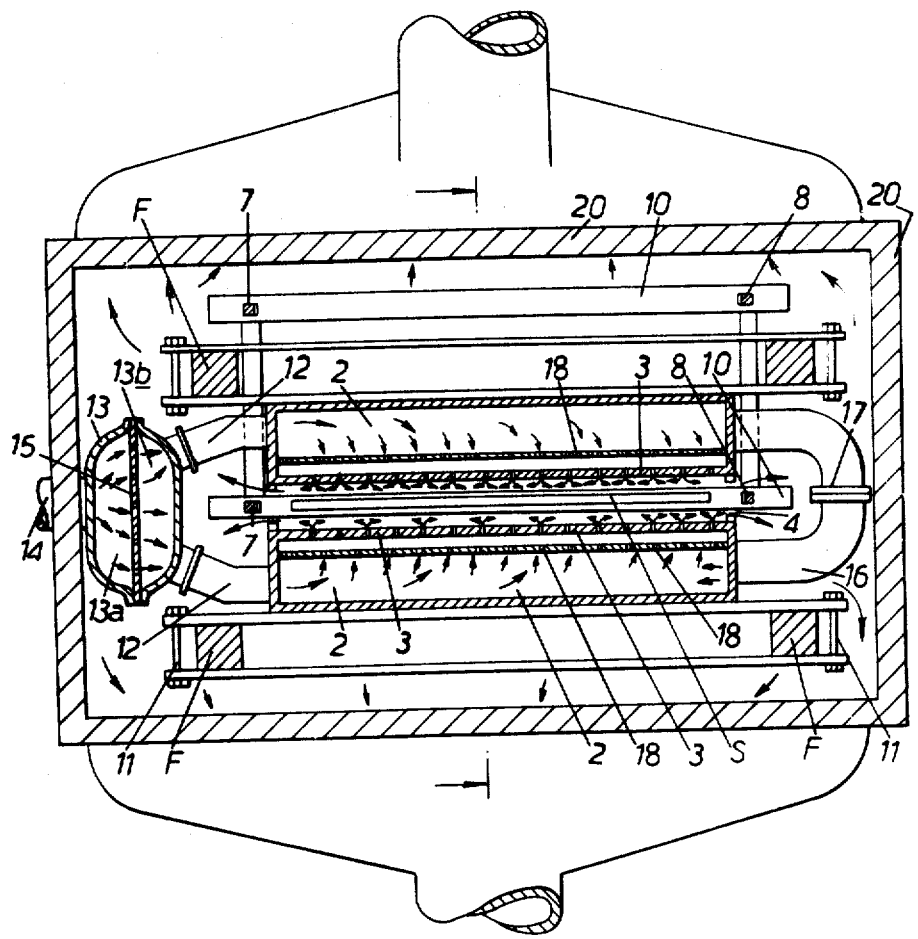
FIG. 2 shows a cross-section taken across the line 2—2 of FIG. 1, FIGS. 3 and 4 are diagrammatic views in front and side elevation respectively of vertical conveyor system for use with the apparatus of FIGS. 1 and 2.

FIGS. 1 and 2 shows glass treatment apparatus having a glass heating zone and a cooling zone. As shown, a plurality of heated gas boxes 2 comprising the heating zone, are arranged in pairs one above the other, each pair having oppositely disposed gas discharge faces 3 which define therebetween a vertically extending gap 4 for the passage of glass sheets. Further gas boxes 5 comprising the cooling zone, are similarly arranged in pairs above the heating zone and have respective apertured gas discharge faces 6 defining therebetween an upward continuation of the gap 4.

A vertical conveyor comprising two endless chains 7 and 8 is provided with equally spaced glass support members 10. Each support member 10 is adapted to support a glass sheet S thereon by its lower edge, and to carry the glass sheet S upwardly within the gap 4 through the heating and cooling zones successively.

As may be seen from FIG. 2, each gas box 2 is of rectangular section, and is perforated over its gas discharge face 3 to provide a plurality of gas outlets. Each gas box 2 is adjustable in position vertically relative to vertical frame members F, and is clamped to respective said members F by means of bolts 11 at the desired position.

Each gas box 2 is connected by way of a duct 12 to a vertical gas manifold 13 which is supplied with hot gases by way of a supply duct 14. The manifold 13 is separated into two compartments 13a, 13b by a vertical perforated plate 15, so that the gas released by the duct 14 into the compartment 13a passes into the compartment 13b through the perforated plate 15 and in so doing is uniformly distributed within the compartment 13b, so that a substantially uniform gas supply to all the gas boxes 2 through ducts 12, is achieved.

To assist in maintaining uniform gas pressure in the gas boxes 2, each respective pair of boxes 2 is interconnected by way of a duct 16 which is flanged and bolted at 17 to facilitate rapid replacement of individual gas boxes 2. The ducts 16 allow an unrestricted passage of gas to maintain equal pressures in the gas boxes 2 of each pair.

The gas released into each gas box 2 escapes through the perforations in the gas discharge face 3 thereof. The size of the perforations, and the distribution thereof over the surface 93a of the gas box 92, is such that the gas is discharged from each face 3 in a substantially uniform distribution.

To assist in achieving a uniform distribution of the gas through the perforations in the gas discharge face 3, a diffuser plate 18 in the form of a perforated plate is disposed in each gas box 2 and separates the discharge face 3 from the part of the gas box 2 with which the duct 12 communicates.

The heating zone is enclosed by a heat insulating wall 20 having a bottom 21 and a roof 22 which are provided with slot-like openings therethrough to allow the passage of the conveyor chains 7, 8 and support members 10.

The heating treatment zone is also separated into a plurality of regions by intermediate partitions 23 (only one of which is shown), which are also slotted to allow the passage of the conveyor chains 7, 8 and support members 10 therethrough.

The opposed pairs of gas boxes 2 release hot gas streams which impinge on opposite faces of a glass sheet S passing therebetween through the gap 4. As well as heating the glass sheet S these gas streams provide gaseous cushions on the opposite faces of the glass sheet S so that the sheet S is balanced in a neutral vertical plane between the gas boxes 2. The glass sheet S can be raised through the gap 4 in the glass heating zone without making contact with any mechanical support other than the support member 10.

The gas forming the gaseous cushions escapes from the space between the respective face of the glass sheet S and the respective gas discharge face 3 by flowing outwardly from this space into the spaces at either end of the respective gas box 2 and also through the spaces between adjacent gas boxes 2. Gas outlet ducts 24, arranged below each intermediate partition 23 and below the roof 22, allow gases released from the gas boxes 2, to be withdrawn from the heating zone. The withdrawn gases can be re-heated and returned to the supply duct 14 or can be passed through a heat exchanger before being passed to atmosphere.

In addition to being heated by the hot gas streams the glass sheet S in this embodiment is also heated by electrical radiant heaters 25 arranged in the spaces between adjacent gas boxes 2, and also by radiant heat from the faces 3 of the gas boxes 2, the latter being heated by the radiant heaters 25 and by the hot gases flowing therethrough. The overall effect is to heat the glass sheet S to the strain point of the glass before the glass sheet S leaves the heating zone through the roof 22. The term "strain point" in this context means the temperature at which the viscosity of the glass is such that strains in the glass are relieved by flow in the glass.

Upon leaving the glass heating zone each heated glass sheet S is conveyed through the cooling zone between the gas boxes 5 which discharge cool gas, for example ambient air, against the glass sheet S. The rapid chilling of the glass sheet S which results causes, in known manner, a toughening of the sheet S.

Each gas box 5 is constructed in a similar manner to a gas box 2, cold air being fed into each gas box 5 through a side supply duct (not shown). The gas passes through a diffuser plate 26 and is released through the respective apertured discharge face 6. Opposite pairs of gas boxes 5 are interconnected by a duct 27 to assist in establishing uniform pressures in the boxes 5.

As each glass sheet S passes through the cooling zone, the cold gas streams impinging on the opposite surfaces of the sheet form gaseous cushions which balance the sheet S to maintain it vertical, in the same manner as described above with reference to the gas boxes 2.

The rate of movement of a glass sheet S through the heating zone is relatively slow. If the glass sheet S was advanced into the cooling zone at the same slow rate of movement, the upper regions of the glass sheet S would be cooled appreciably while the lower regions of the sheet were still in the heating zone. Such conditions are undesirable since they could lead to failure of, or at least distortion and undesirable stresses in, the glass sheet S. Accordingly, the vertical conveyor system for the sheets S allows for a rapid movement of each glass sheet S between the heating zone and the cooling zone.

Figure 3:
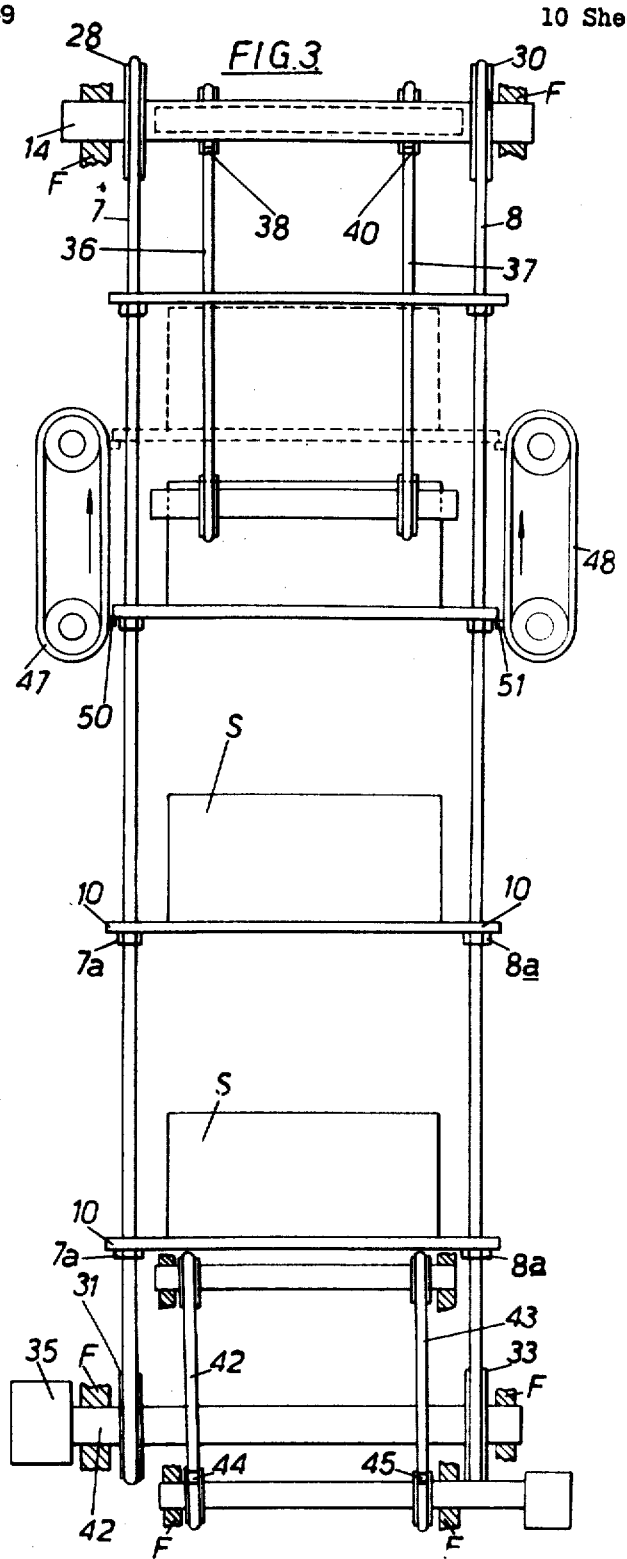
Figure 4:
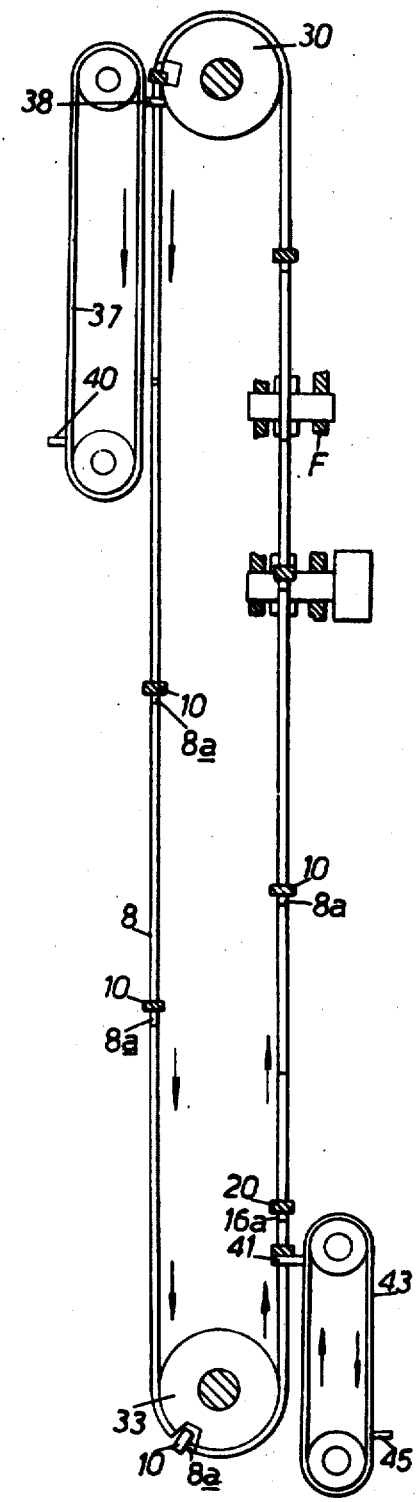

In FIGS. 3 and 4 the conveyor system for the glass sheets S is shown diagrammatically, the gas boxes 2, 5 being omitted for clarity. The two parallel endless conveyor chains 7, 8 pass over upper and lower sprocket wheels 28, 30 and 31, 33, the lower wheels 31, 33 being driven by a motor 35. The sprocket wheels 28, 30 and 31, 33 are respectively mounted above and below the upper and lower extremities of the glass treatment apparatus shown in FIG. 1.

The chains 7 and 8 each carry a plurality of equally spaced apart lugs 7a and 8a respectively, opposite pairs of which support respective glass support members 10.

Each support member 10 is free to slide vertically on the chains 7, 8 between adjacent lugs 7a, 8a thereof.

To prevent the uncontrolled drop of a support member 10 on the chains 7, 8 when the respective lugs 7a, 8a descend on the return run of the conveyor outside the gap 4, two parallel endless chains 36, 37 are arranged parallel to the chains 7, 8 adjacent the upper end of the return run thereof. Each chain 36, 37 carries respective lugs 38, 40 which catch each member 10 as it is released by upper sprocket wheels 28, 30 and lower the member 10 in a controlled manner on to the reverse sides of the preceding lugs 7a, 8a.

The total downwards run of the chains 36, 37 has a length at least equal to the spacing between adjacent lugs 7a, 8a plus a distance equal to the vertical displacement of the lugs 7a, 8a while the chains 36, 37 are effecting transfer of a sheet. For example, if the chains 36, 37 each have two lugs 38, 40 situated at equal intervals, and the chains 36, 37 were driven at twice the speed of the chains 7, 8, the positions of the lugs 38, 40 would be such that they coincide with a support member 10 at the top of each chain 7, 8 in operation of the conveyor system and support said member 10 through at least twice the vertical spacing of the lugs 7a, 8a. Conveniently, however, the chains 36, 37 are displaced at many times the speed of the chains 7 and 8.

By means of the above arrangement each member 10, passing over chain wheels 28, 30 while engaging the leading faces of lugs 7a and 8a, is, upon being freed from chain wheels 28, 30, controllably lowered onto the trailing faces of the preceding lugs 7a, 8a and is conveyed thereby down the downwards run of chains 7, 8 and into engagement with chain wheels 31, 33.

The chain wheels 31 and 33 are, in like manner to chain wheels 28, 30, recessed as shown at 33a to receive the members 10 and to allow passage of said members 10 about the periphery of said chain wheels 31, 33 with lugs 7a, 8a engaging on or in colse proximity to the leading face of the member 10.

After each support member 10 has passed around the lower sprocket wheels 31, 33 the lugs 7a, 8a, which supported the member 10 during its descent on the chains 7, 8, are now located above the member 10, so that the chains 7, 8 can freely slide through holes in the member 10 while the member 10 remains stationary relative to the chains 7, 8.

Two endless parallel vertical chains 42, 43 are arranged adjacent the lower end of the upward run of the chains 7, 8 in a similar manner to the chains 36, 37, except that the chains 42, 43 are driven intermittently, and in the opposite direction to the chains 7, 8. Each chain 42, 43 carries respective lugs 44, 45 which are arranged, while each chain 42, 43 is stationary, to support each support member 10 as it leaves the sprocket wheels 31, 33, until it is "picked up" by the next following lugs 7a, 8a.

In the conveyor system as thus far described each glass support member 10 undergoes a cycle of movement during which it is held stationary on lugs 44, 45 for a short period, and is then displaced on lugs 7a, 8a at uniform speed along a vertical path defined by the upwards run of chains 7a, 8a. The member 10 passes over sprocket wheels 28, 30 after passing through the heating and cooling zones, and after release from engagement with lugs 7a, 8a it is supported by lugs 38, 40. The member 10 is then accelerated downwardly until it engages the trailing faces of the preceding lugs 7a, 8a whereupon the member 10 is conveyed downwardly by the chains 7, 8 and around the lower sprocket wheels 31, 33. The member 10 then again loses contact with its supporting lugs 7a, 8a but is engaged by lugs 44, 45, accelerated up the initial part of the upward run of the chains 7, 8, and finally held stationary on the lugs 44, 45 until picked up by the following lugs 7a, 8a.

The stationary location of the glass support member 10 on the lugs 44, 45 allows a glass sheet S to be loaded on to the respective support member 10 prior to being elevated through the glass treatment apparatus. After traversing the treatment apparatus the glass sheet S is removed from he support member 10 as the sheet S approaches the upper sprocket wheels 28, 30.

A secondary conveyor system is disposed between the heating and cooling zones and comprises endless conveyor chains 47, 48 which are arranged at the sides of the chains 7, 8 respectively and parallel thereto. The chains 47, 48 carry lugs 50, 51 which are so arranged that when the chains 47, 48 are driven by motors (not shown) the lugs 50, 51 move upwardly in the paths of the extreme ends of the members 10 and at a speed greater than that of the chains 7, 8.

When a glass sheet S has been heated to the strain point of the glass, as described above, the upper edge of the glass sheet S lies near to but beneath roof 107. At this stage drive is connected to the chains 47, 48 and the lugs 50, 51 engage beneath the extreme ends of the member 10 and raise the latter with the glass sheet S thereon rapidly from the heating zone into the cooling zone, the member 10 sliding upwardly along chains 7, 8. The drive to chains 47, 48 is discontinued when the whole of the glass sheet S lies within the cooling zone. The member 10 with the glass sheet S thereon is then supported in the cooling zone by the lugs 50, 51 until the continuous movement of chains 7, 8 brings lugs 7a, 8a into re-engagement with the undersurface of the member 10, after which the member 10 and the glass sheet S continue their upward movement on the chains 7, 8 through the cooling zone. The chains 47, 48 are then repositioned to transfer the next following glass support member 10 from the heating to the cooling zone.

Means (not shown) are provided at the bottom and top of the conveyor system for respectively loading and unloading glass sheets S.

Figure 5:
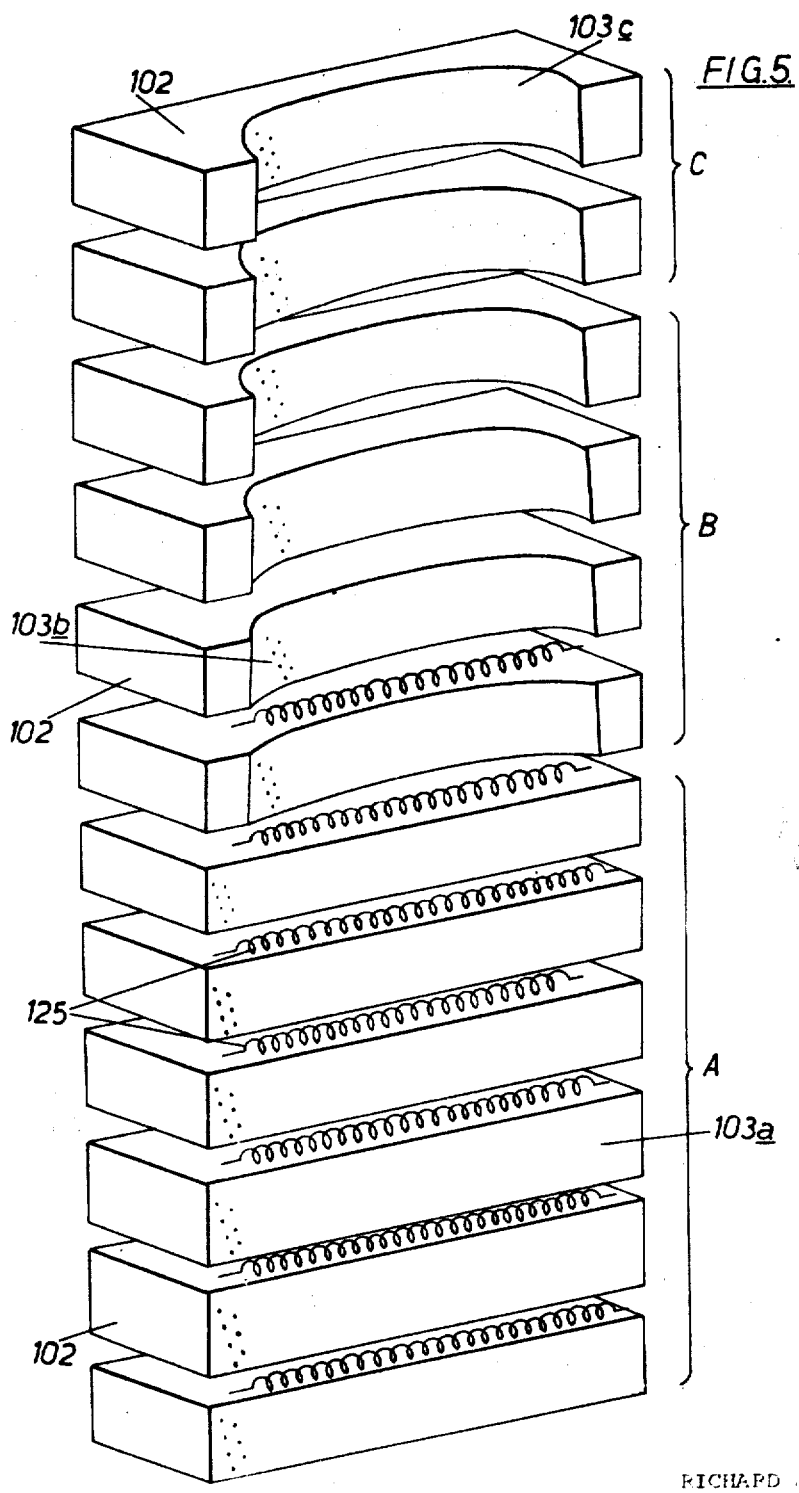
FIG. 5 is a diagrammatic perspective view of some of the gas boxes of a second embodiment of the invention for bending and toughening glass sheets.
Figure 6:
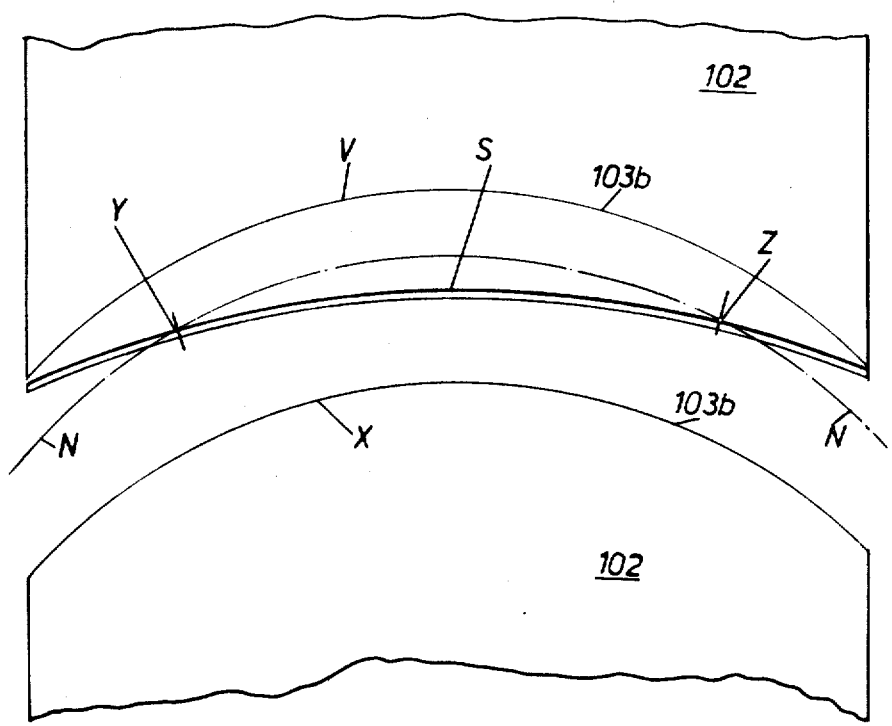
FIG. 6 is a diagrammatic horizontal cross-section through a pair of gas boxes in the bending zone of the embodiment of FIG. 5.

FIG. 5 to 7 are concerned with a modification of the invention which includes a zone for bending the heated glass sheets S before these are passed to the cooling zone.

FIG. 5 shows a perspective diagrammatic view of one bank of gas boxes 102 arranged vertically and extending through a heating zone A, a bending zone B, and a cooling zone C. The gas boxes 102 have gas discharge faces 103, and it will be understood that further gas boxes with complementary gas discharge faces are arranged opposite the gas boxes 102 to define with the faces 103 thereof a vertically extending gap 104 (FIG. 6) passing through the three zones A, B, C.

The gas boxes 12 in the heating zone A have flat perforated gas discharge faces 103a and are adapted to receive and discharge heated gas in the same manner as the gas boxes 2 of the embodiment of FIGS. 1 and 2. Thus a glass sheet S traveling vertically upwardly through the heating zone A is heated by hot gas discharged through the faces 103a and by electric heating elements 125 which are situated between adjacent gas boxes 102. In traversing the heating zone A, the glass sheet S is heated to a temperautre at which it can be bent and the heated glass sheet S is then passed from the heating zone A into the bending zone B where the gas boxes 102 have respective gas discharge faces 103b which define with the complementary faces of opposite said boxes (not shown) a gap curved about a vertical axis, the gap having a curvature which increases with height in the bending zone B. A horizontal section through a pair of opposed gas boxes 102 in the bending zone B is shown in FIG. 6. Jets of hot gas are discharged from the faces 103b of opposing boxes 102 in directions normal to said surface. Where jets from opposing faces 103b impinge a neutral region, where there is no resultant gas flow towards either face 103b, is defined, this region lying substantially in a curved surface N, shown in broken lines in FIG. 6 and referred to herein as the "neutral surface."

The gas boxes 102 in the bending zone B are arranged so that their gas discharge faces 103b have curvatures which increase progressively in an upward direction. Thus a glass sheet S is shaped progressively as it passes upwardly through the bending zone B until it reaches the desired curvature about a vertical axis. The gas boxes 102 are removable and can be replaced by gas boxes having different shapes to afford different curvatures of bending of the glass sheet.

Upon leaving the bending zone B, with the desired curvature about a vertical axis imparted thereto, the glass sheet S is transferred to the cooling zone C where it is cooled to a temperature at which the sheet will maintain the bend imparted thereto. This cooling may also effect a toughening of the glass sheet S.

FIG. 6 shows diagrammatically, and not to scale, a glass sheet S lying between two perforated gas discharge faces 103b, labelled V and X, of a pair of opposed gas boxes 102, both faces V and X having the same curvature. The glass sheet S is shown with a greater radius of curvature than the faces V and X, so that the glass sheet S intersects the neutral surface N which would exist in the absence of the sheet S at two points Y, Z.

Since there are opposed pressure gradients from the faces V and X to the neutral surface N, relatively larger forces are exerted on those parts of the glass sheet S which are closer to the respective gas discharge face V, X, so that the sheet is urged to adopt the curvature of the neutral surface N. At the same time, the overall forces exerted on the glass sheet S by the gas streams from the faces V, X impinging on opposite surfaces of the sheet S are balanced, so that the sheet S is maintained in its vertical orientation by a cushioning effect, as in the embodiments of FIGS. 1 and 2.

FIG. 7 illustrates diagrammatically a modified conveyor system suitable for conveying glass sheets S through the heating, bending and cooling zones A, B and C successively. Three endless chains 131, 132, 133 are passed respectively around lower sprocket wheels 134, 135, 136, mounted on a common shaft 137 disposed below the heating zone A and driven by a motor 138. Above the cooling zone C, the chains 131, 132, 133 pass over respective idler sprocket wheels 139, 141, 143.

The chains 131, 132 and 133 are of equal length and respective glass support members 145, 146 and 147 are spaced at equal intervals on the chains 131, 132 and 133, each set of support members 145, 146, 147 being in horizontal alignment so that each glass sheet S conveyed by the conveyor system is supported at three points with its lower edge horizontal. The support members 145, 146 and 147 contact each glass sheet S by way of an asbestos mat or wire mesh contact element (not shown).

FIGS. 8 and 9 show partly in section single gas boxes 102 from the heating zone A and the bending or cooling zones B, C respectively. Each box 102 is formed of sheet metal with its gas discharge face 103 formed on a perforated block 150, the face 103 in the heating zone A being flat (FIG. 8) and the face 103 in the bending zone B or cooling zone C being curved (FIG. 9). Each block 150 comprises refractory material and is formed with three vertically extending T shaped guide slots 151 for receiving the respective conveyor chains 131, 132, 133 (not shown) each said chain running in the slot at the head of the T, and the respective support members 145, 146, 147 extending outwardly through the narrow part of each slot 151 beyond the respective face 103. Supply ducts for heated gas are shown at 152.

The dimensions and the disposition of each guide slot 151 are such that the respective glass support members 145, 146, 147, as they pass upwardly through the zones A, B and C successively, remain in the neutral surface N (FIG. 6) between the opposing gas boxes 102, notwithstanding the changes in curvature of the faces 103 of successive boxes 102. Thus, as shown in FIG. 7, the separation of the chains 131, 132 and 133 is shown changing progressively in a vertical direction, so that, as the sheet is progressively bent, the positions of the support members 145, 146 and 147 relative to the lower edge of the supported sheet S remains constant.

As in the embodiment of FIGS. 1 and 2, each glass sheet S is balanced by the opposing gas streams throughout its vertical travel through the zones A, B and C and the only part of the glass sheet S which is contacted mechanically is the lower edge thereof resting on the three glass support members 145, 146 and 147.

If the glass sheets S are to be annealed the cooling after bending is effected slowly, but if the sheet is to be toughened it is cooled rapidly and rapid transfer from the bending zone B to the cooling zone C must be effected to prevent a severe temperature gradient from being established from the leading edge to the training edge of each sheet S during the transfer. A reciprocating fork (not shown) driven by endless chains may be used for effecting rapid transfer of individual sheets S between the bending zone B and the cooling zone C, or, alternatively, transfer conveyor chains such as the chains 47, 48 of FIGS. 3 and 4 may be used.

In many cases it may be undesirable for the glass sheets S to be stationary between the gas boxes 102 of the cooling zone C because, with many types of gas box, the gas streams directed against the heated glass sheet S to effect cooling thereof affect the toughening pattern. Means may be provided for reciprocating the supported glass sheets S vertically over a short distance to ensure that the glass sheet S does not remain stationary in the cooling zone C. Such reciprocation could be effected by chains such as the chains 47, 48 of FIGS. 3 and 4. Alternatively, such chains may be used to accelerate the sheets during transfer into the cooling zone C and then, by reducing the speed of the chains, to advance the sheets slowly through the cooling zone.

Glass sheets S for treatment may be sunpported in an upright disposition and conveyed, for example, on rollers to the base of the conveyor system shown in FIG. 7. The upright disposition of the glass sheets S is maintained by opposed gas jets from pairs of further gas boxes (not shown) arranged on either side of the horizontal path along which each sheet S is conveyed to the base of the vertical conveyor system.

The glass sheets S need not be fed to the vertical conveyor system at ambient temperature, but may be moved to the base of the vertical conveyor system along a horizontal path, for example, on a roller conveyor, between further gas boxes supplied with heated gas. Thus the glass sheets S can be heated during horizontal displacement by the hot gases from said further gas boxes and by electric heating elements between the boxes, so that the sheets S are delivered to the vertical conveyor in a preheated condition. In fact the heat imparted to each sheet S is traversing a horizontal conveyor of this nature can be sufficient to raise the temperature of the glass to its strain point.

The gas boxes 2, 102 illustrated and described hereinbefore have substantially continuous perforated gas discharge faces 3, 103 apart from the vertical slots 151 in the faces 103. FIGS. 10, 11 and 12, however, show three alternative constructions for the gas boxes, in this example for the heating zone A, the reference numerals used corresponding to those of FIGS. 8 and 9.

In the example illustrated in FIGS. 10 and 12 a gas box 102 with a block 150 forming the discharge face 103 thereof is supplied with gas by way of a duct 190 (FIG. 12) which opens into the rear face of the box 102. The face 103 of the block 150 is recessed to receive electrical radiant heating elements 125.

With the construction illustrated in FIG. 10 the radiant heating elements 125 heat the glass sheets S traversing the heating zone A much more quickly than they would be heated by the gas boxes 102 alone, while said radiant heating elements 125 do not interrupt significantly the supply of gas from the boxes 102, so that glass sheet S may be kept balanced between opposing pairs of said boxes 102.

Each gas box 102 is supported from a fixed frame F (FIG. 12) of the apparatus by two straps 192, 193 which are bolted to parts of the fixed frame F by bolts 195. Each duct 190 has a flanged connection 196 to the main hot gas supply duct indicated by reference 197 (FIG. 12), so that each gas box 102 can be individualy attached and supported from the machine frame F and, moreover, can be readily removed from and re-assembled in the apparatus.

FIG. 11 shows a further alternative construction wherein the gas box 102 is supplied with hot gases by way of a duct 152, and wherein the front of the box 102 comprises a block 198. The gas discharge face of the block 198 is formed with vertical guide slots 151 which allow for the passage therethrough of the chains 131, 132 and 133 and the support members 145, 146 and 147 (not shown). Said gas discharge face of the block 198 is recessed so that the extreme forward region of each block 198 is divided into three narrow co-planar faces 103', 103'', 103''', and within the recesses electric heating elements 199 are positioned. Said recesses are provided with guide plates forming a vertical continuation of each guide slot 151 being adjacent faces 103', 103'', 103''' to guide the glass support members 145, 146, 147 as these traverse the block 198 vertically.

The faces 103', 103'' and 103''' are perforated by holes extending rearwardly and opening into the gas box 102, and the gases released from said holes are delivered at a sufficient pressure to maintain the glass sheet S passing therebetween in a vertical balanced disposition. The relatively large area of radiant heating elements 199 in combination with the relatively large area of the glass sheet S exposed thereto allows a high rate of heat input into the glass sheets S in the heating zone A.

In all the gas boxes described having T-shaped guide slots for guiding the glass support members 145, 146, 147 carried by the conveyor chains 131, 132, 133 the distance between adjacent gas boxes 102 in the vertical direction is always less than the depth of a support member 145, 146, 147, so that each support member is always guided by the aligned guide slots 151 and is never released from the guidance afforded thereby throughout the height of the apparatus.

In all the embodiments described above, except that of FIG. 11, each gas box releases gas into the space between the front face of the gas box and the glass and the gas in said space has escaped only by flowing substantially parallel to the major face of the glass sheet S, to escape upwardly, downwardly, or sideways, from said space.

FIGS. 13 and 14 show an alternative construction for a gas discharge face in which gas is supplied to a gas box 201 which lies between front and rear walls 202 and 203, and the gas is allowed to escape from said chamber by flowing along bores 204 in a block 205 forming the front face of the gas box 201.

A plurality of exhaust ducts 206 are spaced over the face of block 205 and open into tubes 207 which pass rearwardly through the box 201 and through the rear wall 203 so as to exhaust into the space enclosed by the furnace walls rearwardly of the gas box 201. By this means a gas cushion of substantially uniform pressure is obtained between each block 205 and the glass sheet S, to maintain the latter vertical.

In all the gas boxes previously described the apertures in the front face of the gas box are arranged in rows which are preferably inclined to the horizontal (FIG. 14) or staggered relatively to the direction of movement of each glass sheet S so that no part of the glass sheet S is continuously exposed to the direct flow of gas from aligned gas discharge apertures. Accordingly, in FIG. 14 the bores 204 are shown staggered relative to the direction of movement of a glass sheet as indicated by the arrow G. The exhaust ducts 206 are arranged in an identical pattern with the bores 204, and are each evenly spaced relative to the nearest bores 204.

The use of exhaust ducts 206 spaced over the gas discharge face of the gas box 201 allows the space between the glass sheet S and the block 205 to be reduced without unduly restricting the gas flow out of the said space. Consequently the gap between opposing pairs of gas boxes 102 can be substantially reduced and a more uniform support afforded thereby to a vertically travelling glass sheet. Allowing the gap between co-operating gas boxes to be reduced by this means is also beneficial in permitting more accurate bending of the glass sheets S when a bending zone B is provided than that obtainable using gas boxes of the type shown, for example, in FIG. 9.

It will be appreciated that the necessary heat treatment of the glass sheets preceding the bending thereof need not necessarily be carried out in a vertically extending heating zone, as described; thus the heated glass sheets could be transferred to a vertical conveyor for passage through a vertical bending zone.

It will also be appreciated that with the bending method of the present invention as described above the bends imparted to a glass sheet S are always formed about a vertical axis, and as each glass sheet S is in an upright disposition and bent about a vertical axis it is not subject to gravitational distortion during or after bending.

In the apparatus specifically described the glass sheets are conveyed vertically in an upward direction through heating and toughening zones successively. In some cases it may be found advantageous to move the sheets downwardly, to avoid hot gases from the heating zone rising into the toughening zone and interfering with the cooling of the glass sheet thereat.

The present invention has been described by way of example to illustrate the heating and toughening of flat glass sheets and the heating, bending, and toughening of glass sheets. It will be appreciated, however, that many other glass treatment processes can be carried out by means of this invention. Thus, for example, a glass sheet supported between gaseous cushions and with only its lower edge in contact with a solid support may have one or both of its faces coated with a coating material before or during displacement of the coated glass sheet, and the glass sheet can be supported without its major faces making contact with any solid support during subsequent processing of the coated sheet.

I claim:

1. A method of bending a glass sheet to a desired curvature in which said sheet is disposed in an upright disposition, comprising engaging the glass sheet only along its lower edge on a vertically moving support to support the glass sheet without marring the faces thereof, directing heated gaseous streams against each face of the sheet to heat the sheet and to produce forces acting on the sheet which correct any deviation of the sheet from the upright disposition, moving the support and the glass sheet vertically within a cavity wall structure having apertured faces of complementary and progressively increasing curvature about a vertical axis to define a vertically extending gap, and directing heated gas through discharge outlets in the apertured faces onto the sheet, while the apertured faces progressively bend the sheet, stage by stage, to the desired curvature and heated gases passed through said outlets maintaining the sheet in its upright disposition throughout the bending operation.

2. A method according to claim 1 including the step of impinging cold gaseous streams against the faces of said sheet after treatment thereof by the heated gaseous streams and during continued vertical movement of the support and the glass sheet, rapidly to cool and toughen the sheet.

3. A method according to claim 1, in which the glass sheet is pre-heated by being conveyed along a horizontal heating zone before transfer for vertical conveying through the bending station.

4. Apparatus for heating and then bending a glass sheet to a desired curvature, comprising means defining a heating zone followed by a bending zone and which means includes opposed walls defining therebetween a substantially vertical gap, conveyor means for engaging a glass sheet only along its lower edge whereby to support same without marring the faces of the glass sheet and for conveying the sheet through said heating zone and vertically through said bending zone, and means defining gas discharge outlets in the opposed walls for directing gaseous streams against opposite faces of the sheet to heat the sheet in said heating zone and bend the sheet in the bending zone and to maintain the sheet in a substantially vertical orientation as it is conveyed through said heating and bending zones, said opposed walls presenting gas discharge faces of complementary and progressively increasing curvature about a vertical axis and along the vertical direction of movement of the sheet by said conveyor means through said gap whereby to provide said bending zone within said gap, and gas supply means for supplying heated gas to said outlets.

5. Apparatus according to claim 4, wherein said means defining a heating zone followed by a bending zone comprises at least one pair of gas boxes having oppositely disposed gas discharge faces, each face having therein a plurality of said discharge outlets, the gas boxes being connected to said means for supplying heated gas.

6. Apparatus according to claim 5, in which a pressure equalising duct interconnects each pair of gas boxes.

7. Apparatus according to claim 5, in which each said gas box is provided internally with a perforated pressure-distributing plate through which gas passes before reaching said discharge nozzles.

8. Apparatus according to claim 5, including means defining a cooling zone immediately above said bending zone and including a pair of cooling gas boxes having opposed perforate surfaces, and means for supplying cooling gas to said cooling gas boxes, the conveyor means being arranged to pass a glass sheet vertically upwardly through the bending and cooling zones in succession.

9. Apparatus according to claim 8, wherein means are provided for transferring a heated glass sheet rapidly from the bending zone to the cooling zone at a rate faster than the rate of movement of the conveyor means.

10. Apparatus according to claim 4, wherein the conveyor means comprise at least two endless chains extending vertically and parallel to the said gap and having support members connected to said chains for supporting respective glass sheets by their lower edges.

11. Apparatus according to claim 4, wherein said means defining a heating zone followed by a bending zone includes at least one pair of gas boxes within said bending zone having curved, complementary gas discharge faces in which some of said discharge outlets are provided.

References Cited

UNITED STATES PATENTS

| | | | |
|---|---|---|---|
| 2,263,005 | 11/1941 | McClure | 65—106 |
| 2,476,169 | 7/1949 | White | 65—106 |
| 3,223,443 | 12/1965 | Misson | 65—25 UX |
| 3,223,501 | 12/1965 | Fredley | 65—106 |
| 3,282,447 | 11/1966 | McMaster | 65—182 A |
| 3,346,360 | 10/1967 | O'Connell | 65—104 |
| 3,362,806 | 1/1968 | Brewin | 65—25 A |
| 3,375,094 | 3/1968 | McMaster | 65—25 A |
| 3,457,055 | 7/1969 | Brewin | 65—106 |
| 3,476,542 | 11/1969 | Ritter | 65—104 |

S. LEON BASHORE, Primary Examiner

R. H. ANDERSON, Assistant Examiner

U.S. Cl. X.R.

65—106, 182 A, 351